US006097497A

United States Patent [19]

McGraw

[11] Patent Number: 6,097,497

[45] Date of Patent: Aug. 1, 2000

[54] SYSTEM AND METHOD FOR AUTOMATING PRINT MEDIUM SELECTION AND FOR OPTIMIZING PRINT QUALITY IN A PRINTER

[75] Inventor: Montgomery C. McGraw, Spring, Tex.

[73] Assignee: Compaq Computer Corporation, Houston, Tex.

[21] Appl. No.: 09/026,223

[22] Filed: Feb. 19, 1998

[51] Int. Cl.[7] ........................ G06K 15/00

[52] U.S. Cl. ........................ 358/1.12; 358/1.18

[58] Field of Search ........................ 395/101, 111, 395/112, 106, 117, 113; 347/12, 15–16, 43; 358/502; 235/437, 494

[56] References Cited

U.S. PATENT DOCUMENTS 5,489,767 2/1996 Billington ........................ 285/437

5,774,146 6/1998 Mizutani ........................ 347/43

*Primary Examiner*—Arthur G. Evans

*Attorney, Agent, or Firm*—Jenkens & Gilchrist, a professional corporation

[57] ABSTRACT

A technique for the automatic detection of certain characteristics of the print medium being used in a printer is disclosed. These characteristics may include, without limitation, the manufacturer, the finish, the quality, orientation, and the dimensions of the print medium. Each sheet of specialty print medium is marked at the point of manufacture or packaging with certain preassigned numeric or symbolic codes that uniquely identify the characteristics of the print medium. Sensors are added to each printer to automatically detect and decode the markings on the speciality print media. This information is used to automatically optimize the printer for the best print quality possible.

14 Claims, 4 Drawing Sheets

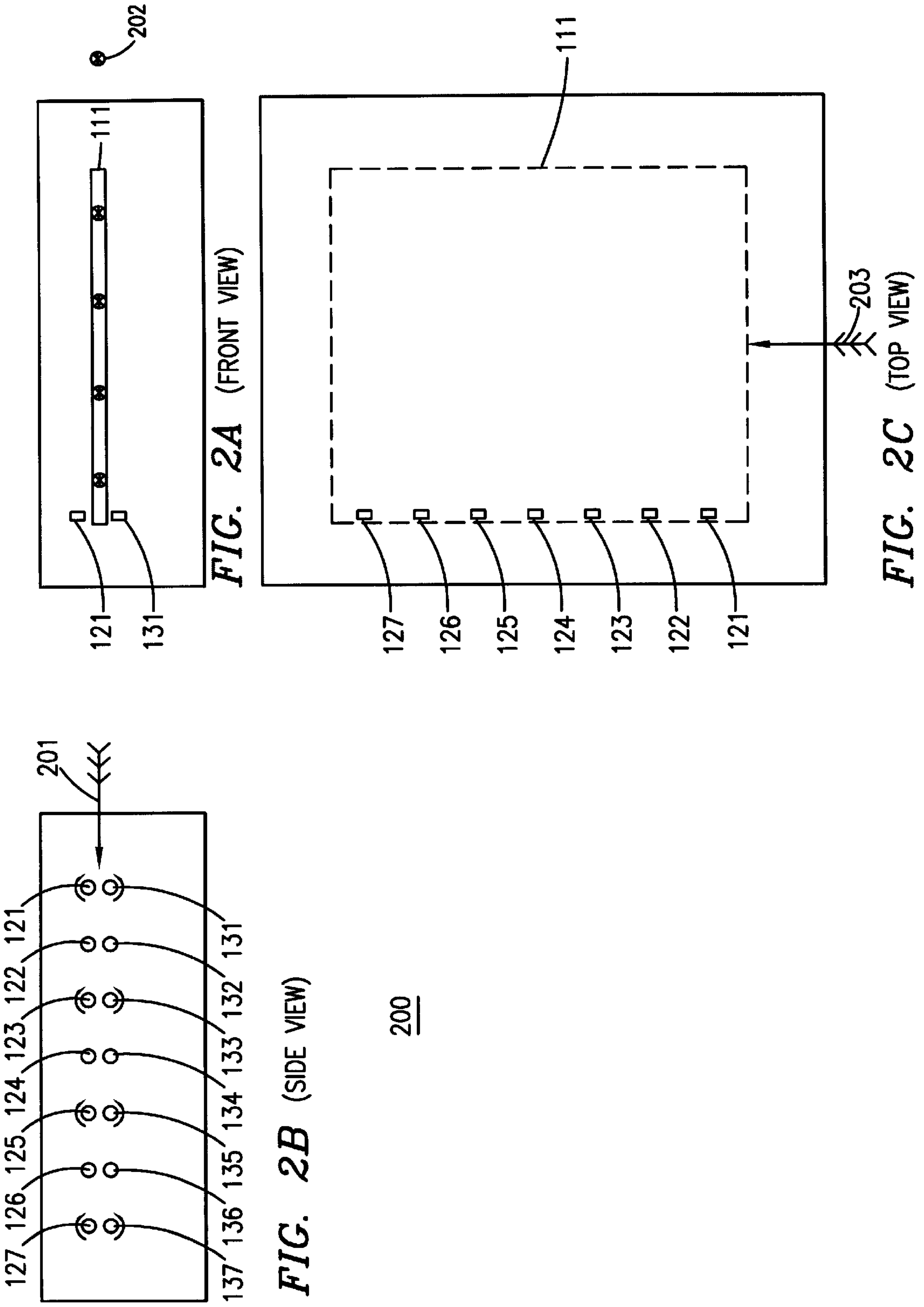
FIG. 2A (FRONT VIEW)
FIG. 2C (TOP VIEW)
FIG. 2B (SIDE VIEW)

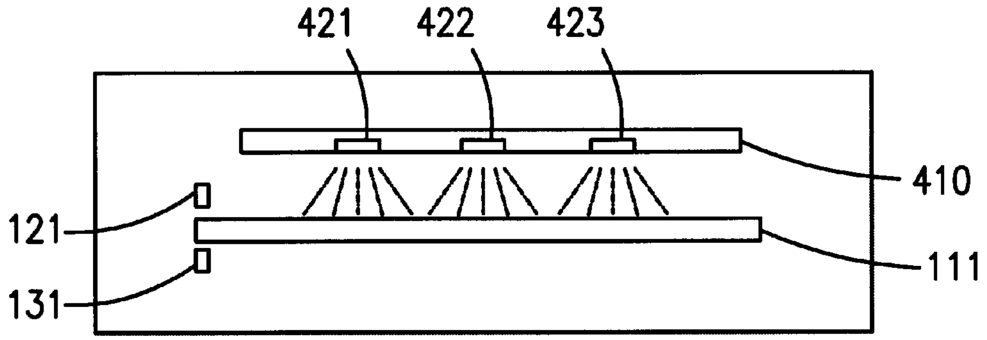
FIG. 4A (FRONT VIEW)
400
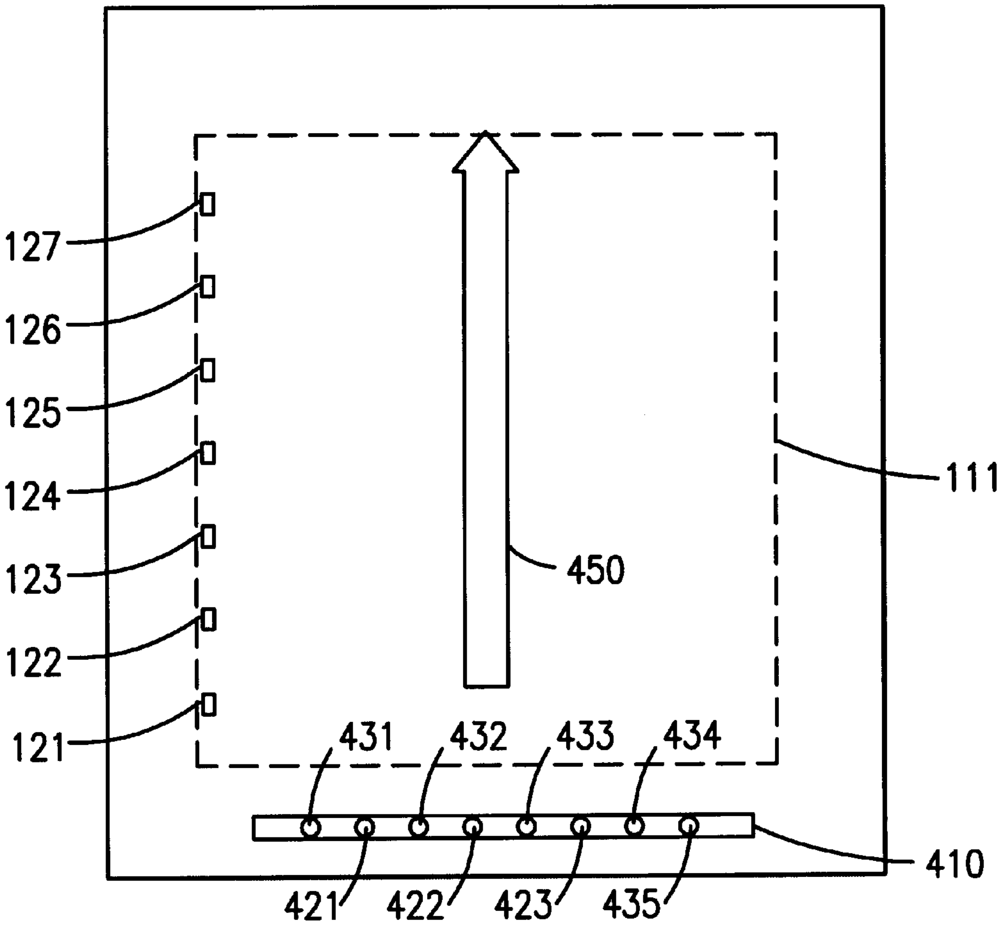
FIG. 4B (TOP VIEW)

SYSTEM AND METHOD FOR AUTOMATING PRINT MEDIUM SELECTION AND FOR OPTIMIZING PRINT QUALITY IN A PRINTER

TECHNICAL FIELD OF THE INVENTION

The invention relates to the field of printing technology, and more particularly, to techniques for automating the optimization of print quality by a printer by sensing the type of the print medium being printed on.

DESCRIPTION OF RELATED ART

The print quality of inexpensively-priced printers has advanced remarkably in recent years. Inkjet printers are now capable of printing near photo quality color images. However, this usually requires that a special type of paper be used. Since some of these special types of printer papers are not truly made of paper, these printer materials will generally be referred to as "speciality print media" in the present patent application. A variety of speciality print media are available in the marketplace. These speciality print media vary in cost and offer different levels of print quality.

One of the types of speciality print media is called coated paper. Coated paper has special coating to improve inkjet print quality on plain paper. Coated paper is usually only moderately more expensive than plain paper. Another type of speciality print medium that is especially useful with inkjet printers is glossy paper. Glossy paper has a shiny finish and is typically more expensive than coated paper. Glossy paper permits a higher print quality to be obtained than with coated paper. At the top end is a speciality print medium called film that is close to the quality Obtainable with photographic print stock.

In spite of the higher print quality that may be obtained by printing on speciality print media, it has been found that many users still use plain paper in their inkjet printers. The use of plain paper for printing multi-color text and graphics usually results in relatively poor print quality.

In many commercially-available inexpensive inkjet printers, the printer driver is capable of adjusting the inkjet printer painting scheme differently for each variety of print medium, including plain paper. However, this usually requires the user to specify the correct paper type to the printer using the keypad of the printer or the print settings menu in the printer driver software.

If a user fails to select the correct type of print medium—as is often likely because the selection of the print medium type is often buried under several levels of menu selections amongst the advanced printer settings selection options in the printer driver interface—the resulting print quality obtained is usually poor. Poor print quality may often discourage a user from further trying color printing. Furthermore, the unit cost of specialty print media is quite high, which discourages experimentation by users.

Many manufacturers of inkjet printers also offer a selection of various types of special inkjet print media that have been optimized for their respective printers. However, due to various factors noted above, the sales and use of speciality print media in the consumer market have hitherto been limited. It has been found desirable for printers to have the ability to adapt their printing schemes based on the characteristics of the medium they are printing on. It has further been found desirable to find techniques for making such print quality optimizations both simply and selectively.

A scheme for classifying print media into various classes based upon the characteristics that are important to the printing process would be of great utility to the printer market. It would additionally be useful if this classification were encoded onto (or somehow associated with) each sheet of the print medium. It would consequently be desirable for printers to have the ability to sense the type of print medium currently in use. It would be desirable if the encoding scheme that is used could be extended to encode the size of the print medium. It would also be helpful if a printer could detect inaccuracies in the orientation of the print media being fed into a printer.

SUMMARY OF THE INVENTION

Therefore it is a primary object of the present invention to automate the detection by a printer of the type of print medium being used by a printer. It is a further object of the present invention to permit a printer to optimize the painting scheme used by the print head based upon certain known or predicted characteristics of the type of print medium detected. The characteristics that may be used for print quality optimizations by the printer include, without limitation, the manufacturer, the type, the finish, the unit weight, the composition, the quality and the dimensions of the print medium.

In one aspect of the present invention, each sheet of specialty print medium is marked at the point of manufacture with certain preassigned numeric or symbolic codes that uniquely identify the characteristics of the print medium. Sensors are added to each printer to automatically detect and decode the markings on the speciality print medium. This information is used by the printer to automatically optimize the printer for the best print quality that may be possible for the detected type of print medium. This technique can enhance the ease of use of the printer and additionally reduce the wastage of expensive speciality print media.

In another aspect of the present invention, the markings made on each sheet of print medium may be selectively placed so as to be either visible or invisible, as desired. Furthermore, the markings may be placed on either side of each sheet of print medium, although consistency in the pattern of placement can admittedly simplify and reduce the cost of the detection logic. A digital coding scheme is used to compactly code, inter alia, a variety of print medium types and sizes. The detection of the print medium size is a task that is critical for determining the preset margins for each size of print medium.

If a visible marking scheme is used, such visible marks are typically placed on the reverse side (i.e. the nonprinting side) (but, it should be expressly noted, such marks are not limited to the reverse side) of each sheet of speciality print media since most specialty print media are coated only on the front side (i.e. the image bearing side). If an invisible marking scheme is used, such invisible marks can be placed on either side of the print medium. Invisible marking techniques that may be used include imprinting dyes that are visible only under ultra-violet violet (UV) or infra-red (IR) illumination.

In functional terms, printers using the system and method of the present invention are largely identical to currently available printers except that they include certain additional logic and hardware, such as one or more light sources (that emit either visible or invisible light, based upon the encoding implementation that is selected) and one or more sensors coupled with decoders. The decoders generate signals indicating the type of print medium that have been detected These signals are relayed to the printer driver. The printer driver uses this information about the characteristics of the print medium to optimize the painting scheme used by the print head for the type of print medium being used.

The simplest marking scheme would be to use the fixed paper guide as a datum and to place encoded information about the characteristics of the print medium code at a standard or predictable location relative to this datum. The paper characteristics sensor(s) could then look for each permitted mark at the specified position relative to the fixed edge of the print medium or at a sequence of different distances from the fixed edge of the print medium.

BRIEF DESCRIPTION OF THE DRAWINGS

A more complete understanding of the method and system of the present invention may be obtained by reference of the detailed description of the preferred embodiments that follow, taken in conjunction with the accompanying drawings, wherein:

FIGS. 2A, 2B and 2C are simplified front, side, and top, respectively, diagrammatic representations of the print medium path in a typical printer;

FIGS. 4A and 4B show certain details of the sensor mechanisms of the present invention that permits the detection and decoding of encoded information regarding the characteristics of the print medium.

DESCRIPTION OF THE PREFERRED EMBODIMENT

Figure 1:
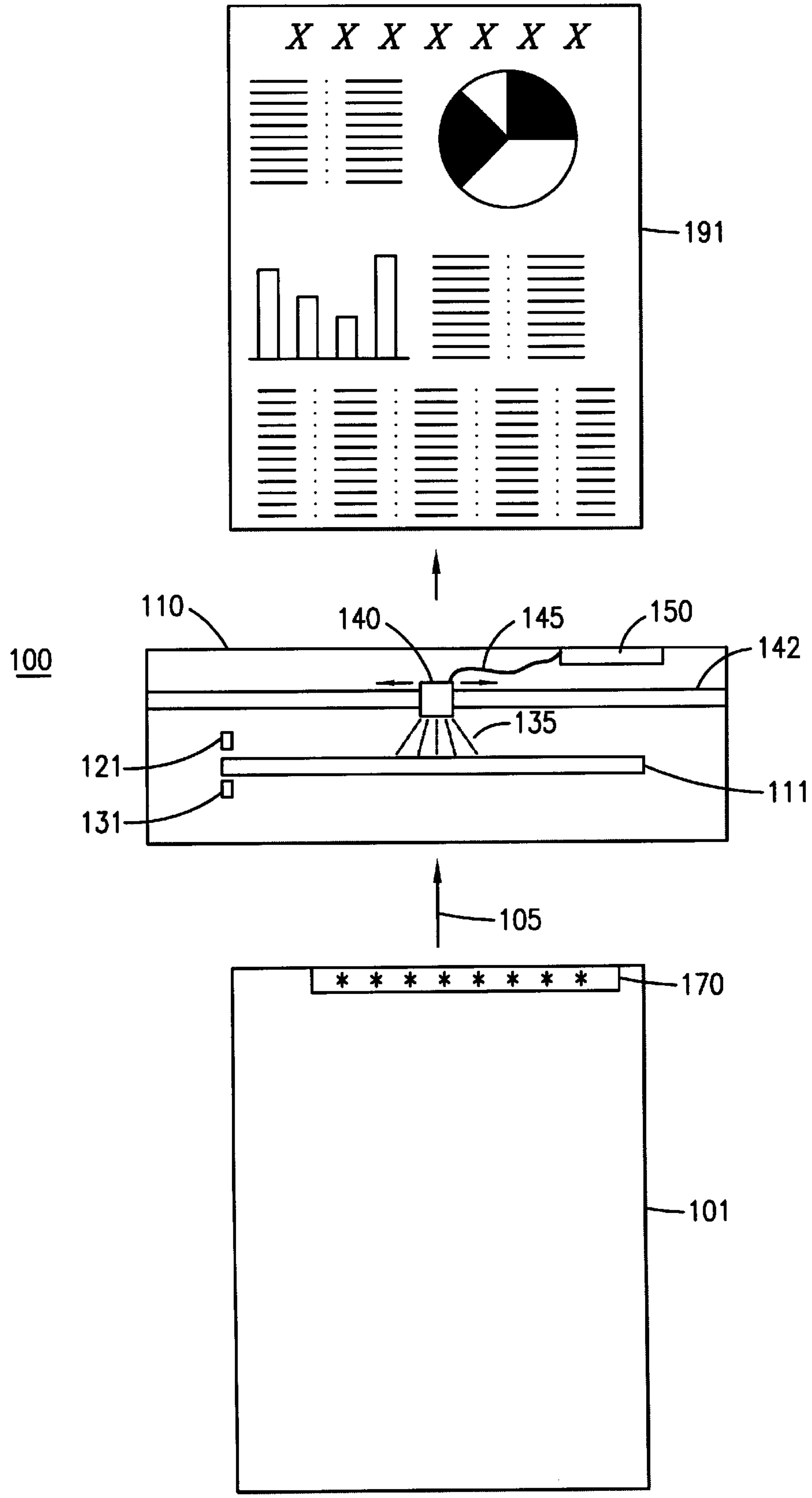
FIG. 1 is a simplified overview of the printing process in a typical inkjet printer.

FIG. 1 is a simplified overview of the printing process in a typical inkjet printer. A sheet of print medium 101 is fed into the print medium transport mechanism of an inkjet printer 110 as shown by the directional arrow 105. The markings 170 on the sheet of print medium 101 lie at the core of the present invention and are explained in greater detail in conjunction with the discussion of the FIGS. 3 & 4.

Each sheet of print medium 101 may be transported through the printer by a variety of mechanisms. One of the common mechanisms is to use pinch rollers to grip the edge of the print medium. Only one pair of pinch rollers 121 and 131 are shown in the simplified depiction of FIG. 1. Typically, only one of each pair of pinch rollers 121 and 131 are driven by a motor in order to transport the print medium through the printer. The other pinch roller of the pair is typically free-rolling.

As the sheet of print medium 111 moves through the printer 110, droplets of ink 135 are sprayed on to the print medium by the print head 140. The print head 140 typically comprises an electromagnetic mechanism to control the spray of ink droplets 135 from one or more ink cartridges (not shown in FIG. 1). A print head that is capable of only black-and-white (or one-color) printing typically contains only one ink cartridge. In contrast, a print head that is capable of multi-color printing typically contains either three or four ink cartridges—one black ink cartridge and three cartridges for the three primary colors.

The print head 140 is typically much smaller than the width of the sheet of print medium 101. Consequently, the print head is slidably mounted on a slider bar 142 in a way as to permit the print head to traverse the entire width of the sheet of print medium being printed on. The print head 140 is connected to the printer driver electronics 150 by a flexible electrical connection 145. As shown in FIG. 1, such an inkjet printer is capable of printing both text as well as color graphics (as shown at 191) on the sheet of print medium 101.

FIGS. 2A, 2B and 2C are simplified front, side, and top, respectively, diagrammatic representations of the print medium path in a typical printer. As shown in FIG. 2C, a sheet of print medium 111 may be gripped along one edge by one or more powered pinch rollers 121–127. The sheet of print medium 121 is sandwiched between pairs of top pinch rollers 121–127 and bottom pinch rollers 131–137 as is best seen in FIG. 2A. The print medium path is indicated by the directional arrows 201, 202 and 203 in the side-view, front-view and top-view respectively.

As noted earlier, modern inkjet printers contain mechanisms for optimizing the print quality to the type of print medium being used in the printer. There are at least four types of print media that are commonly used in inkjet printers: plain paper, coated paper, glossy paper and film. Of these four types of print media, plain paper offers satisfactory print quality only for black-and-white printing. Satisfactory color printing typically requires the use of one of the other three type of print media. As noted earlier, the unit cost of glossy paper is higher than that of coated paper and less than that of film. Correspondingly, the print quality offered by glossy paper is higher than that of coated paper but less than that of film.

Modern inkjet printers use different printing schemes for each of these different types of print media. The failure by a user to specify the type of print medium being used usually results in the printer reverting to the default print medium type setting of the printer. Commonly the default print medium type setting used by inkjet printers is plain paper. Predictably, this often results in the printed color output being of sub-optimal, even poor, quality.

In addition to the different painting schemes used for the different types of print media, each manufacturer's printing schemes may include other optimizations that improve the print quality of their printers when they are used with their recommended print media. It should be noted that there are often variations in the quality of the print media of a single type between the products of different print media manufacturers. Furthermore, identical print media may sometimes yield different results when used on inkjet printers made by different manufacturers.

Other print medium selection problems commonly faced by present-day users of inkjet printers include the fact that speciality print media have directionality, i.e., that they need to be printed only on a specified side to yield optimal results. It has additionally been found to be desirable for an inkjet printer to have knowledge and awareness of the dimensions and thickness of the print medium being used. Such information can be used by the printer for many purposes, such as, for setting margins, for preventing over-spray outside the boundaries of the print medium and for adjusting the transport mechanism to reduce smudging and paper jams, etc.

Therefore, it would be useful to have a standardized scheme to communicate information about the characteristics of the print medium to the printer. In the preferred embodiment of the present invention, this is done by creating an encoding scheme that communicates information about the characteristics of the print medium—such as print medium size, orientation, type and manufacturer, and suggested classes of printers on which this medium would achieve optimal results—to the printer.

Figure 3B:
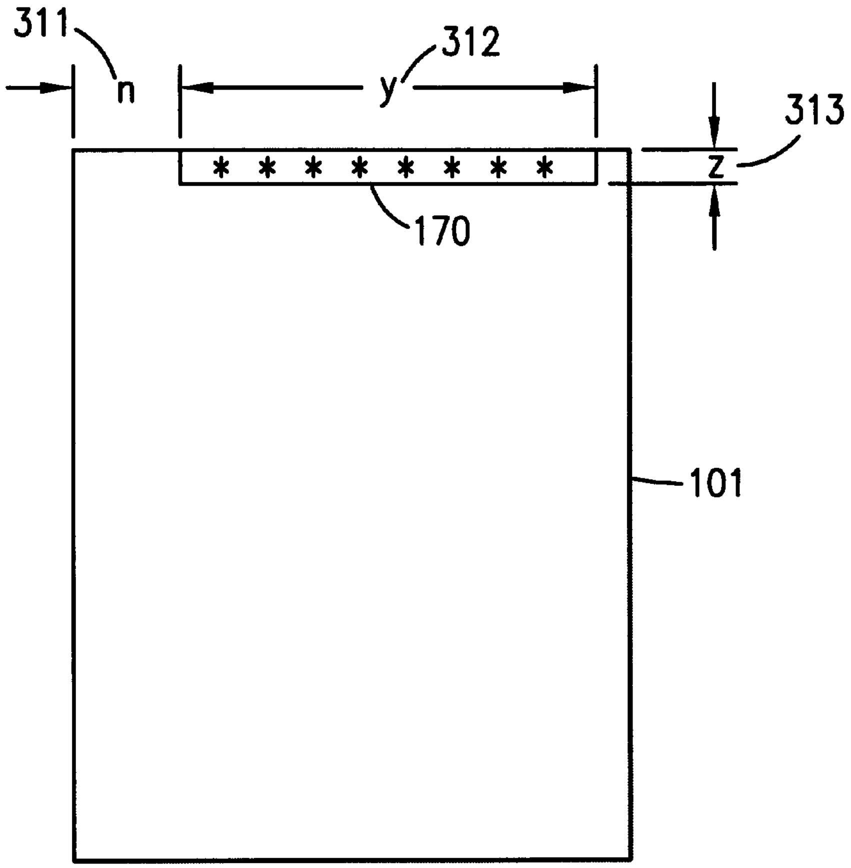
FIGS. 3A and 3B illustrate certain aspects of the print medium encoding scheme of the present invention.
Figure 3A:
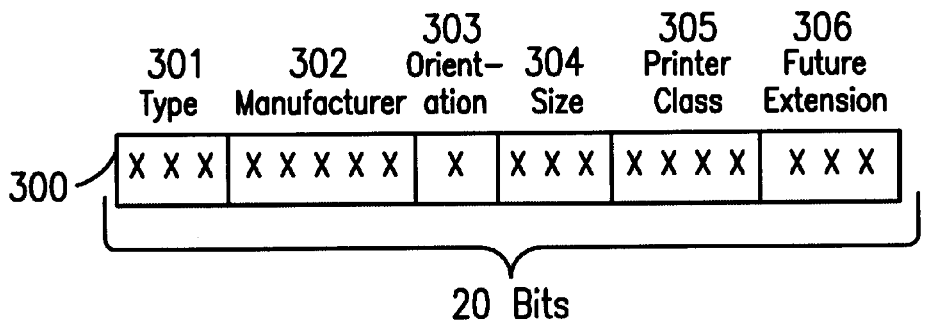

FIG. 3 illustrates certain aspects of the print medium encoding scheme of the present invention. As shown in FIG.

3, in the preferred embodiment of the present invention, the information about the characteristics of the print medium is expressed in the form of a 20-bit binary number called the print medium identifier 300. The print medium identifier 300 comprises a 3-bit print medium type identifier 301, a 6-bit print medium manufacturer identifier 302, a 1-bit print medium orientation-sensitivity specifier 303, a 3-bit print medium size identifier 304, a 4-bit printer class identifier 305, and a 3-bit reserved field for future extensions.

In one embodiment of the present invention, this 20-bit print medium identifier 300 is marked into a rectangular zone alongside one edge of the print medium as shown in FIG. 3B. This rectangular zone 170, which may be of varying dimensions, is indicated by the reference letters y 312 and z 313 in FIG. 3B. For practical reasons, this rectangular zone 170 needs to be placed in a standardized or predictable location. In one embodiment of the present invention, this rectangular zone 170 is located at a distance x 311 from the reference edge of the print medium. It should be emphasized that other encoding and marking schemes may be used to achieve the same or equivalent results.

The marking of the print medium identifier 300 on the print medium 111 can be made either visible or invisible to the naked eye. Invisible marking techniques that may be used include marking with dyes that are visible only under ultra-violet (UV) or infra-red (IR) illumination. Furthermore, the marking may be placed on either the front or the back side of the print medium. As noted earlier, speciality print media yield best results when printed on their "front" sides. Since these print media are relatively expensive on a unit cost basis, aesthetic considerations may dictate that the markings, if visible, be placed on the back sides of these media.

In another embodiment of the present invention, a simple marking scheme is used to affix the print medium identifier 300 to the print medium 111. This marking scheme uses the fixed paper guide as a datum to place the print medium identifier 300 at a standard or specified location relative to this datum. A print medium sensor then looks for each permitted mark at the specified position relative to the fixed edge of the print medium guide or at a sequence of different distances from the fixed edge of the print medium guide.

As noted earlier, the encoding and marking scheme of the present invention involves marking each sheet of specialty print medium with certain information, and adding sensors to each printer to automatically detect the encoded information. This encoded information could then be used to automatically optimize the printer to generate the best quality results. Such a technique could increase the ease of use of inkjet printers and permit inexperienced users to generate high-quality color images and text using their printers.

FIG. 4 shows certain details of the sensor mechanisms of the present invention that permit the detection and decoding of encoded information regarding the characteristics of the print medium. In functional terms, a printer that is capable of handling the "smart paper" of the present invention (i.e. print medium with encoded information markings or holes in the medium or other such markings) would largely be identical to a standard inkjet printer. The two key additions to the logic of such a standard inkjet printer would be one or more light sources capable of generating either visible or invisible light (depending on the marking scheme used) and one or more sensors for detecting and decoding encoded print medium identification information 300.

In the preferred embodiment of the present invention shown in FIG. 4, a printer capable of handling "smart paper" has a sensor module 410 located adjacent to the point of entry of the print medium into the printer. This permits the characteristics of the print medium to be decoded prior to the start of the printing process. The sensor module 410 comprises light sources 421, 422 & 423 that generate the appropriate illumination for reading the markings on the "smart paper".

Associated sensors 431–435 detect and decode the markings on the "smart paper" and transmit the same to the printer driver electronics 150 over a connection (not shown in FIG. 4). The direction of motion of the "smart paper" 111 through the augmented printer of the present invention is shown by the directional arrow 450 in FIG. 4. As explained earlier, the "smart paper" 111 is essentially a combination of the unmarked print medium 101 with the print medium identifier 300 being marked at a specified location 170.

The sensor module 410 may be mounted either above or below the print medium path depending on whether the markings on the "smart paper" are located on the front or the back of the print medium. Since the markings may be placed in either visible or invisible ink, the light sources 421, 422 & 423 generate visible or invisible light as dictated by the marking scheme.

In an alternative embodiment of the present invention, the failure by the sensor module to detect markings on a sheet of print medium causes it to generate a warning that is communicated to the user—typically through the display panel on the printer or by audible means. Such a warning permits a user to verify and ensure that the print medium has been fed correctly into the printer. In a different implementation of the present invention, a user may optionally override the automatic optimization performed by the augmented printer of the present invention. In further, or different, embodiments of the present invention lack of markings could result in automatic choice of plain paper, default size selection, or like events.

In a further extension of the present invention, the augmented printer of the present invention retains information about the markings detected on the last piece of "smart paper" that passed through the printer and uses that information to optimize the print settings for any subsequent sheets of print media that do not contain such markings (or whose markings cannot be read or decoded). Optionally, the use of such stale information to generate default print settings may be coupled with a warning to the user—typically delivered though the printer control panel or by audible means. In a further extension of the present invention, the augmented printer of the present invention accumulates information about the varieties of "smart paper" typically used by the user to statistically predict the characteristics of any unmarked print medium that is fed through the printer.

Although a preferred embodiment of the method and apparatus of the present invention has been illustrated in the accompanying drawings and described in the foregoing detailed description, it is to be understood that the invention is not limited to the embodiment(s) disclosed, but is capable of numerous rearrangements, modifications and substitutions without departing from the spirit of the invention as set forth and defined by the following claims.

What is claimed is:

1. A printer that can use a print medium having encoded information therein in the form of invisible markings, said printer comprising:

an illumination device for illuminating said invisible markings;

an optical sensor for detecting said invisible markings; and software operable to decode said detected invisible markings to obtain information about the characteristics of said print medium, and further operable to use said information to facilitate printer performance.

2. An automated method for adapting the print quality of a printer to the characteristics of a print medium being used in said printer, said method comprising the steps of:

receiving a first print medium at said printer, said first print medium including markings;

detecting markings in said first print medium using one or more sensors;

decoding said detected markings to obtain information about the characteristics of said first print medium;

selecting a painting scheme for the printer based upon said decoded information;

printing on the first print medium according to the selected painting scheme;

receiving a second print medium at said printer, said second print medium not including markings; and responsive to the second print medium not including markings, printing on the second medium according to the painting scheme selected for the first print medium.

3. An automated method for producing print media incorporating individualized information about the characteristics of the print medium, said method comprising the steps of:

collecting information about the characteristics of print media that is of relevance to a printer capable of optimizing its print quality;

encoding said collected information about the characteristics of the print medium into binary form using a prespecified format; and marking said encoded information about the characteristics of said print medium at at least one prespecified location on said print medium.

4. The method of claim 3 for producing print media incorporating individualized information about the characteristics of the print medium, wherein said step of marking said encoded information at at least one prespecified location on said print medium is performed on the front surface of said print medium.

5. The method of claim 3 for producing print media incorporating individualized information about the characteristics of the print medium, wherein said step of marking said encoded information at at least one prespecified location on said print medium is performed on the back surface of said print medium.

6. An automated system for producing print media incorporating individualized information about the characteristics of the print medium, said system comprising:

means for collecting information about the characteristics of print media that is of relevance to a printer capable of optimizing its print quality;

means for encoding said collected information about the characteristics of the print medium into binary form using a prespecified format; and means for marking said encoded information about the characteristics of said print medium at at least one prespecified location on said print medium.

7. The system of claim 6 for producing print media incorporating individualized information about the characteristics of the print medium, wherein said means for marking said encoded information at at least one prespecified location on said print medium is operative on the front surface of said print medium.

8. The system of claim 6 for producing print media incorporating individualized information about the characteristics of the print medium, wherein said means for marking said encoded information at at least one prespecified location on said print medium is operative on the back surface of said print medium.

9. The system of claim 6 for producing print media incorporating individualized information about the characteristics of the print medium, wherein said means for marking said encoded information at at least one prespecified location on said print medium additionally comprises visible ink.

10. The system of claim 6 for producing print media incorporating individualized information about the characteristics of the print medium, wherein said means for marking said encoded information at at least one prespecified location on said print medium additionally comprises invisible ink.

11. The printer of claim 1 wherein said illumination device is one of an ultra-violet source and an infra-red source.

12. A system for adapting the print quality of a printer, said system comprising:

a processor; and a storage device connected to said processor, said storage device for storing instructions readable by said processor to thereby cause said processor to:

receive an indication that a first print medium is at said printer, said first print medium including markings;

receive an indication of said markings included with said first print medium;

decode said markings to obtain information about the characteristics of said first print medium;

select a painting scheme for the printer based upon the decoded markings;

initiate printing on the first print medium according to the selected painting scheme;

receive an indication that a second print medium is at said printer, said second print medium not including markings; and responsive to the second print medium not including markings, initiate printing on the second medium according to the painting scheme selected for the first print medium.

13. The system of claim 12 further comprising:

an illumination source for illuminating said markings on said first print medium.

14. The system of claim 13, wherein said illumination source includes one of an ultra-violet source and an infra-red source.

* * * * *

UNITED STATES PATENT AND TRADEMARK OFFICE

CERTIFICATE OF CORRECTION

PATENT NO. : 6,097,497
DATED : August 1, 2000
INVENTOR(S) : Montgomery C. McGraw It is certified that error appears in the above-identified patent and that said Letters Patent is hereby corrected as shown below:

<u>Claim 3,</u>
Line 12, after "medium" and before the ".", insert the following as the next indented paragraph:

-- wherein said step of marking results in invisible markings on said print medium --.

<u>Claim 6,</u>
Line 10, after "for" insert -- invisibly --.

Signed and Sealed this

Nineteenth Day of February, 2002

*Attest:*

*Attesting Officer*

JAMES E. ROGAN
*Director of the United States Patent and Trademark Office*